(12) United States Patent
Seitz et al.

(10) Patent No.: US 9,036,921 B2
(45) Date of Patent: *May 19, 2015

(54) FACE AND EXPRESSION ALIGNED MOVIES

(71) Applicant: Google Inc., Mountain View, CA (US)

(72) Inventors: Steven Maxwell Seitz, Seattle, WA (US); Rahul Garg, Seattle, WA (US); Irena Kemelmaher, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,686

(22) Filed: Feb. 25, 2014

(65) Prior Publication Data

US 2014/0177969 A1 Jun. 26, 2014

Related U.S. Application Data

(63) Continuation of application No. 13/198,361, filed on Aug. 4, 2011, now Pat. No. 8,693,789.

(60) Provisional application No. 61/371,934, filed on Aug. 9, 2010.

(51) Int. Cl.
| | |
|---|---|
| *G06K 9/68* | (2006.01) |
| *G06K 9/00* | (2006.01) |
| *G06K 9/32* | (2006.01) |
| *G06T 7/00* | (2006.01) |

(52) U.S. Cl.
CPC .............. *G06K 9/00308* (2013.01); *G06K 9/32* (2013.01); *G06T 7/0028* (2013.01); *G06T 2207/20221* (2013.01); *G06T 2207/30201* (2013.01)

(58) Field of Classification Search
CPC ... G06K 9/00308; G06K 9/32; G06K 9/6203; G06K 9/6204; G06K 9/6202; G06T 7/0028; G06T 2207/20221; G06T 2207/30201; G06T 7/001
USPC .......................................... 382/181, 218, 231
See application file for complete search history.

(56) References Cited

U.S. PATENT DOCUMENTS

| | | | |
|---|---|---|---|
| 5,954,650 A | 9/1999 | Saito et al. | |
| 8,693,789 B1 * | 4/2014 | Seitz et al. | 382/209 |
| 2003/0007700 A1 | 1/2003 | Gutta et al. | |
| 2006/0140508 A1 | 6/2006 | Ohgishi et al. | |
| 2006/0251338 A1 * | 11/2006 | Gokturk et al. | 382/305 |
| 2006/0280365 A1 * | 12/2006 | Gong et al. | 382/173 |
| 2008/0310737 A1 | 12/2008 | Han et al. | |
| 2008/0317349 A1 * | 12/2008 | Ishikawa | 382/190 |

(Continued)

*Primary Examiner* — Edward Park
(74) *Attorney, Agent, or Firm* — IP Spring

(57) ABSTRACT

Systems, methods and articles of manufacture for generating sequences of face and expression aligned images are presented. An embodiment includes determining a plurality of candidate images, computing a similarity distance between an input image and each of the candidate images based on facial features in the input image and the candidate images, comparing the computed similarity distances, selecting a candidate image based on the comparing, and adding the selected candidate image to an image sequence for real-time display. Embodiments select images from the image sequence as they are being added to the image sequence and scale, rotate and translate each image so that a face appearing in a selected image is aligned with a face appearing in a subsequently selected image from the image sequence. In this way, embodiments are able to render arbitrarily large image collections efficiently and in real time to display a face and expression aligned movie.

16 Claims, 10 Drawing Sheets

(56) References Cited

U.S. PATENT DOCUMENTS

| | | | |
|---|---|---|---|
| 2010/0080457 A1* | 4/2010 | Stauder et al. | 382/167 |
| 2010/0302595 A1* | 12/2010 | Yamada et al. | 358/1.18 |
| 2011/0194761 A1* | 8/2011 | Wang et al. | 382/165 |
| 2012/0027263 A1* | 2/2012 | Liu et al. | 382/107 |

* cited by examiner

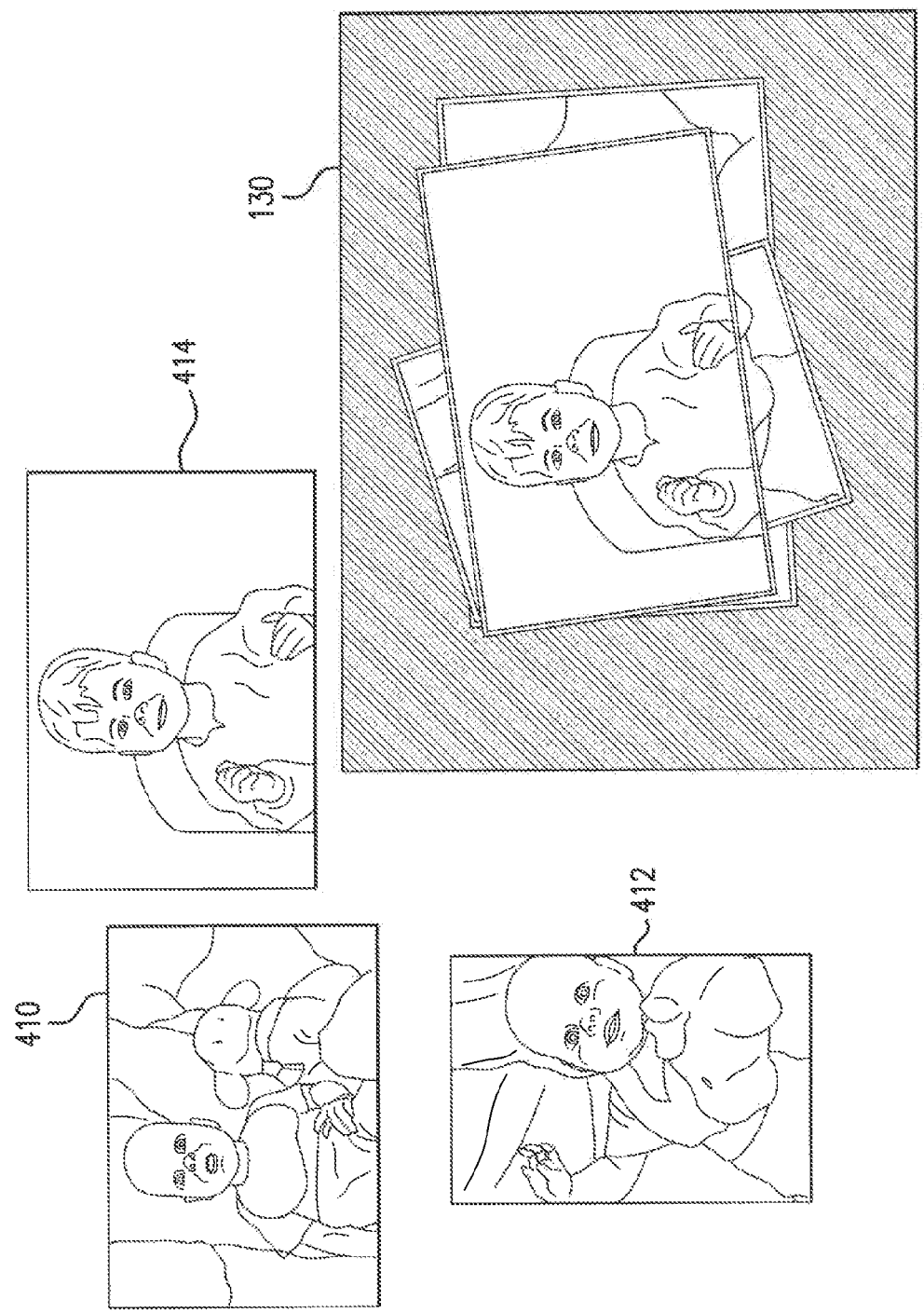

Image 410 displayed on display 130

Image 412 displayed over image 410 on display 130

Image 414 displayed over images 412 and 410 on display 130

FACE AND EXPRESSION ALIGNED MOVIES

CROSS-REFERENCE TO RELATED APPLICATIONS

This patent application claims the benefit of U.S. patent application Ser. No. 13/198,361, filed Aug. 4, 2011, which is the non-provisional of U.S. Provisional Patent Application No. 61/371,934, filed Aug. 9, 2010, which are incorporated herein by reference in their entirety.

BACKGROUND

1. Field

Embodiments generally relate to image similarity and alignment.

2. Background Discussion

Detecting faces in images is a challenging task owing to their variable appearance and the wide range of poses that photographed subjects can adopt. Different image feature sets have been proposed that allow human forms and faces to be discriminated effectively. One such feature set is known as histograms of oriented gradients (HOG). HOG features are known for their effective facial pose and expression discrimination and have been used for classifying similar facial expressions. While feature sets that discriminate faces are being adopted by the computer vision community, such feature sets have not been used for real-time displays of facial images.

BRIEF SUMMARY

Embodiments relate to generating sequences of face and expression aligned images. An embodiment includes determining a plurality of candidate images, computing a similarity distance between an input image and each of the candidate images based on facial features in the input image and the candidate images, comparing the computed similarity distances, selecting a candidate image based on the comparing, and adding the selected candidate image to an image sequence for real-time display. In an embodiment, the candidate images may be temporally related. In an embodiment, a selected candidate image is iteratively used as a next input image until all candidate images are added to the image sequence. Embodiments select and render images from the image sequence for display as they are being added to the image sequence and may scale, rotate and translate each image added to the image sequence so that a face appearing in a selected image from the image sequence is aligned with a face appearing in subsequently selected image from the image sequence. In an embodiment, generation of the image sequence and rendering of images in the image sequence are performed concurrently on separate processing threads. Such a multi-threaded approach achieves improved utilization of processing resources and enables embodiments to render arbitrarily large image collections in real time to display a face and expression aligned movie. Furthermore, candidate images that are determined by the embodiments can include backgrounds usually associated with meaningful photographs.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

FIG. 4B-4E illustrate an exemplary generation of an image sequence, using images illustrated in FIG. 4A, according to an embodiment.

DETAILED DESCRIPTION

Embodiments relate to generating sequences of face and expression aligned images. Embodiments determine a plurality of candidate images that can be temporally related (or related by any other parameter). The candidate images can include faces that are associated with facial expressions and poses in addition to background scenery. Similarity distances are then computed between an input image and each of the determined candidate images. The input image may also include faces that are associated with facial expressions and poses in addition to background scenery. Based on a comparison of the computed similarity distances, embodiments select a candidate image that includes facial features similar to facial features appearing in the input image. In an embodiment, a selected candidate image can have a lowest similarity distance (or is the most similar image with respect to the input image) compared to the corresponding similarity distance of other candidate images. Embodiments can use the selected candidate image as an input image for computing and comparing the similarity distances in a next iteration of selecting and adding a candidate image to the image sequence. Embodiments can also mark the selected candidate image so that it may not be added again to the image sequence in a subsequent iteration. At each iteration, a selected candidate image is added to an image sequence. In an embodiment, images are added to the image sequence until all candidate images have been added to image sequence.

In an embodiment, images in the image sequence are rendered and displayed in real time as they are being added to the image sequence. Embodiments scale, rotate and translate each image in the image sequence before display so that a face (or any facial feature(s) and poses) appearing in a selected image is aligned with a face appearing in subsequently selected image from the image sequence. This process of alignment and display is repeated for all other images in the image sequence. Because the images from the image sequence are aligned and sequentially displayed in real time as they are being added to the image sequence, embodiments are able to generate a face and expression aligned movie.

In this way, embodiments are able to render arbitrarily large image collections in real time. Furthermore, candidate images that are determined by the embodiments can include facial images as well as backgrounds usually associated with meaningful photographs.

While the present embodiments are described herein with reference to illustrative applications, it should be understood that the embodiments are not limited thereto. Those skilled in the art with access to the teachings provided herein will recognize additional modifications, applications, and embodiments within the scope thereof and additional fields in which the embodiments would be of significant utility.

System

Figure 1:
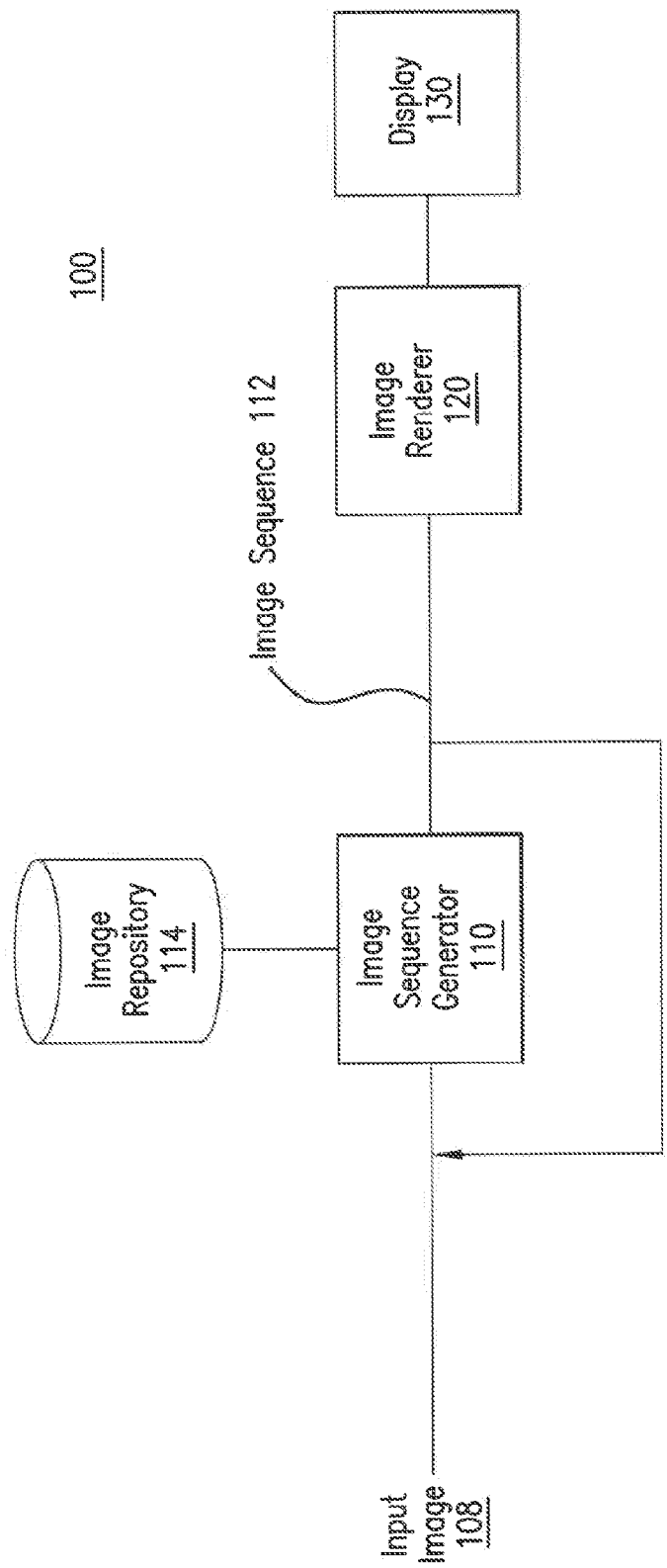
FIG. 1 illustrates a system for generating sequences of face and expression aligned images, according to an embodiment.

This section describes a system for generating sequences of face and expression aligned images according to an embodiment illustrated in FIG. 1. FIG. 1 is a diagram of a system 100 for generating sequences of face and expression aligned images. While the following is described in terms of facial images, the embodiments are not limited to such images, and can be applied to any other forms of photographs or images, including but not limited to industrial imagery, geographic imagery, satellite imagery, street imagery, images acquired using mobile devices/smart-phones or any combination thereof. The embodiments are applicable to any system having generally the structure of FIG. 1, or that would benefit from the operation, methods and functions as described herein.

System 100 includes image sequence generator 110, image renderer 120, image repository 114 and display 130. Image sequence generator 110 and image renderer 120 can be any type of processing (or computing) device having one or more processors. For example, each of image sequence generator 110 and image renderer 120 can be a workstation, mobile device, computer, cluster of computers, set-top box, or other device having at least one processor. In an embodiment, image sequence generator 110 and image renderer 120 may be implemented on the same processing device. Such a processing device may include software, firmware, hardware, or a combination thereof. Software may include one or more applications and an operating system. Hardware can include, but is not limited to, a processor, memory and/or graphical user interface display.

In an embodiment, image sequence generator 110 interacts with data on image repository 114. Image repository 114 can be any form of image database configured to store a plurality of digital images and any metadata (e.g., timestamps) associated with the digital images. Image repository 114 can be any form of hardware storage device (e.g., hard disk, tape storage etc.) or can be can be a workstation, computer, cluster of computers, set-top box, or other device having at least one processor. In an embodiment, and as shown in FIG. 1, image repository 114 can be located separately from image sequence generator 110. In another non-limiting embodiment, image repository 114 can be located within image sequence generator 110. In yet another non-limiting embodiment, image repository 114 can be connected to a wired and/or wireless network (not shown) that enables components of system 100 to communicate with image repository 114 across the network. In one embodiment, image repository 114, image sequence generator 110, image renderer 120 may all be implemented on a single processing device. In another non-limiting embodiment, one or more of image repository 114, image sequence generator 110 and image renderer 120 may be implemented across a cluster of computers that may be interconnected using a wired and/or wireless network.

Display 130 can be, for example and without limitation, a liquid crystal display, a plasma display, a touch screen display, a computer monitor (e.g., a variable graphics array (VGA) display, a super VGA display, or a cathode ray tube display), or other similar types of display devices. In an embodiment, display 130 can be configured to display a graphical user interface (GUI) that provides an interface between a user and an application running on components of system 100. The application can be, for example and without limitation, a image manipulation and processing application, a screensaver creator, photo collection application, a software map application, an email application, a social networking application or a video game. Features of the GUI for an application can be arranged in a pre-defined layout on display 130 or can be generated dynamically to serve specific actions taken by a user, according to an embodiment. For instance, the GUI can display information such as interactive text and graphics, as well enable users to directly interact (e.g., via touch screen) with images displayed on display 130.

Image Sequence Generator 110

In an embodiment, image sequence generator 110 is configured to determine a plurality of candidate images (e.g., K candidate images, where K can be any number) in image repository 114. In a non-limiting embodiment, candidate images are images in repository 114 that are temporally related. Candidate images, for example, can be images that are created (or photographed) close in time. Candidate images can also be, for example, images that have been photographed across long durations of time. Candidate images determined by image sequence generator 110 are not limited to cropped facial images, and can be any photographs that include meaningful background information along with facial imagery. For example, candidate images may include photographs where a facial image is composited over a background scene. In an embodiment, candidate images are determined by image sequence generator 110 by reviewing time stamp information of each image in repository 114 to determine if they are temporally related (e.g., were created (or photographed) close in time). It is to be appreciated that candidate images determined by image sequence generator 110 need not be temporally related and that any other parameters (or metadata) of images in repository 104 may be used by image sequence generator 110 to determine candidate images.

Figure 2:
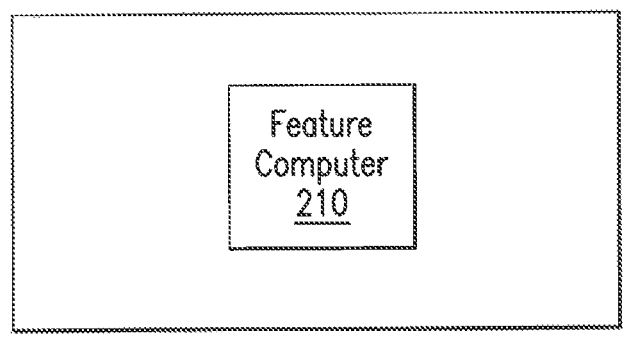
FIG. 2 illustrates a diagram of an image sequence generator, according to an embodiment.

In an embodiment, once the candidate images are determined (e.g., K candidate images), image sequence generator 110 computes a similarity distance between an input image 108 and each of the candidate images. In an embodiment, a similarity distance can be computed by comparing histograms of oriented gradients (HOG) features of input image 108 with corresponding HOG features of each candidate image. HOG features are a form of feature descriptors used in computer vision and image processing for the purpose of face and object detection and are known to those skilled in the art. HOG features can be used to encode a face pose and expression of facial images. In an embodiment, and as shown in FIG. 2, image sequence generator 110 includes feature computer 210 that can be used to compute HOG features. As a purely illustrative example, not intended to limit the embodiments, feature computer 210 can determine HOG features using an image patch (or any grid or mask) centered around any region (e.g., mouth) of a face. In this way, feature computer 210 determines HOG features of faces appearing in both input image 108 and one or more candidate images. The HOG features can then be used by image sequence generator 110 to compute the similarity distances discussed above. HOG features are further discussed in the publication entitled "Histograms of Oriented Gradients for Human Detection, Dalal et al." published in the "Proceedings of the 2005 IEEE Computer Society Conference on Computer Vision and Pattern Recognition (CVPR'05)," which is incorporated by reference herein in its entirety.

Returning to the discussion of computed similarity distances, image sequence generator 110 uses the computed similarity distances to select a candidate image that includes facial features similar to facial features appearing in input image 108. In a non-limiting embodiment, image sequence generator 110 selects a candidate image that has the lowest similarity distance (or most similar image with respect to input image 108) compared to the corresponding similarity distances of other candidate images. In an embodiment, image sequence generator 110 iteratively uses the selected candidate image as a next input image for computing the similarity distance in a next iteration of adding a candidate image to image sequence 112. Image sequence generator 110 can also mark the selected candidate image so that it may not be added again to image sequence 112 in a subsequent iteration. In an embodiment, image sequence generator 110 continues to add images to image sequence 112 until all candidate images in repository 114 (or any subset thereof) are added to image sequence 112. In an embodiment, images in image sequence 112 are rendered and displayed in real time (or as they are being added to image sequence 112) by image renderer 120. In this way, embodiments are able to render arbitrarily large image collections in real time. Furthermore, because the candidate images determined by image sequence generator 110 are not limited to cropped facial images (that lack or have partial background scenes), embodiments can generate and display sequences of meaningful photographs that include facial features with substantial background scene information that provides useful context to a viewer.

Figure 3:
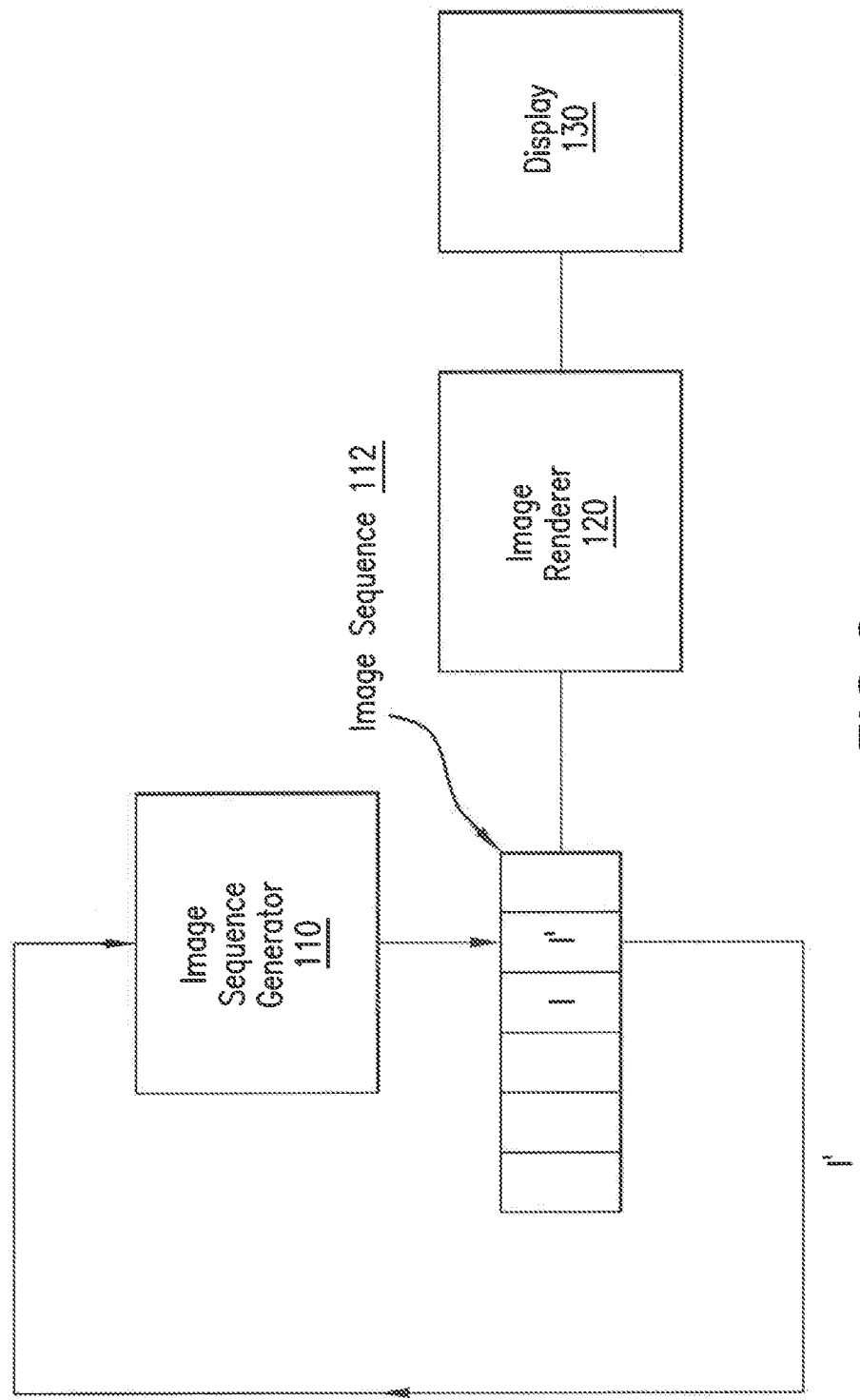
FIG. 3 is a diagram illustrating an exemplary generation of an image sequence, according to an embodiment.

FIG. 3 illustrates an exemplary diagram of image sequence 112 generated by image sequence generator 110. As shown in FIG. 3, image sequence 112 includes images I and I', which in this example are the candidate images selected by image sequence generator 110. Images I and I' can include, but are not limited to, facial features along with background scene imagery. Image I has been added to image sequence 112 prior to image I' by image sequence generator 110. As shown in FIG. 3, image I' is provided as a next input image to image sequence generator 110 for computing and comparing the similarity distances in a next iteration of selecting and adding a candidate image to image sequence 112. In an embodiment, image renderer 120 selects images from image sequence 112, as they are being added (or even upon addition) to image sequence 112, for display on display 130. It is to be appreciated that image sequence 112 of FIG. 3 is disclosed for the purposes of illustration and not limitation and that any form of data structure, list or queue can be used to implement image sequence 112. The operation of image renderer 120 is discussed below.

Image Renderer 120

As discussed above, and according to an embodiment, images in image sequence 112 are rendered and displayed in real time by image renderer 120 as they are being added to image sequence 112 by image sequence generator 110.

In an embodiment, image renderer 120 selects images from image sequence 112 as they are being added to image sequence 112 and may scale, rotate and translate each image so that a face appearing in a selected image is aligned with a face appearing in a subsequently selected image from image sequence 112. In this way, image renderer 120 can display, for example, a first image that includes a first face and then display a second image that includes a second face (similar to the first face) over the first image, such that the first face and the second face are aligned with each other with respect to facial features and pose. In other words, for example, after the first image is displayed, the second image is aligned and subsequently displayed over the first image such that the pose and facial expressions of the first and second face are aligned with each other. This process of alignment and display is repeated for all other images in image sequence 112. Because the images from image sequence 112 are aligned and sequentially displayed, embodiments are able to generate a face and expression aligned movie. In an embodiment, and in addition to aligning images from image sequence 112, image renderer 120 also adds a border to each image prior to display on display 130. As an example, such a border may be customized by a user based on his/her preference.

Figure 4A:
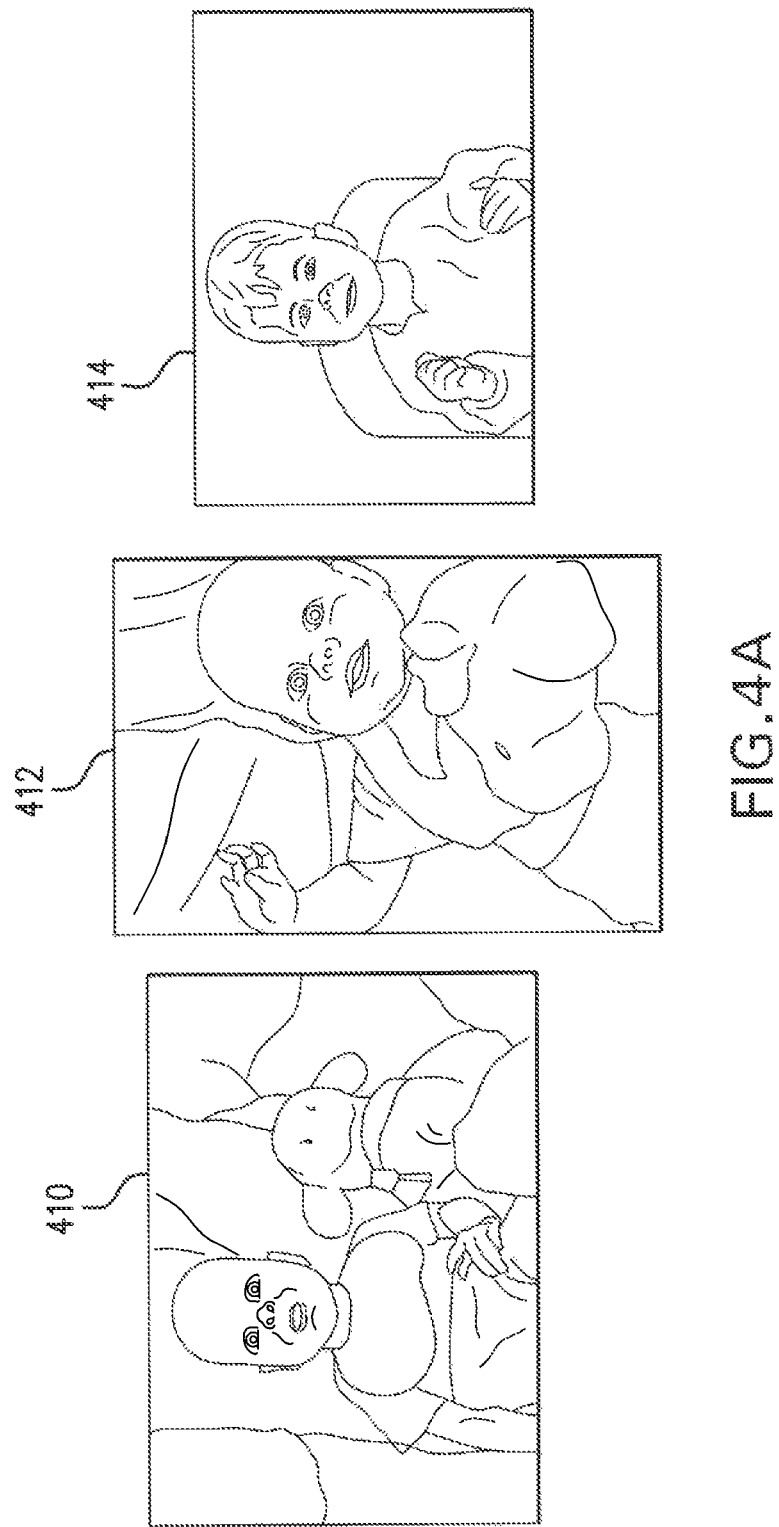
FIG. 4A illustrates exemplary images in a plurality of candidate images, according to an embodiment.

FIG. 4A illustrates exemplary images 410, 412 and 414 that have been added to image sequence 112 by image sequence generator 110. Image 410 includes the face of a child characterized by a facial expression and facial pose. Image 412 also includes the face of the child characterized by a different facial expression and facial pose. Image 412 may have different dimensions, resolution, brightness, hue, saturation, or any other parameter different from image 410. As shown in FIG. 4A, image 412 can have a different background. Image 414 also includes the face of the child characterized by a facial expression and facial pose that is distinct from the child's facial expression and pose in images 410 and 412.

Figure 4B:
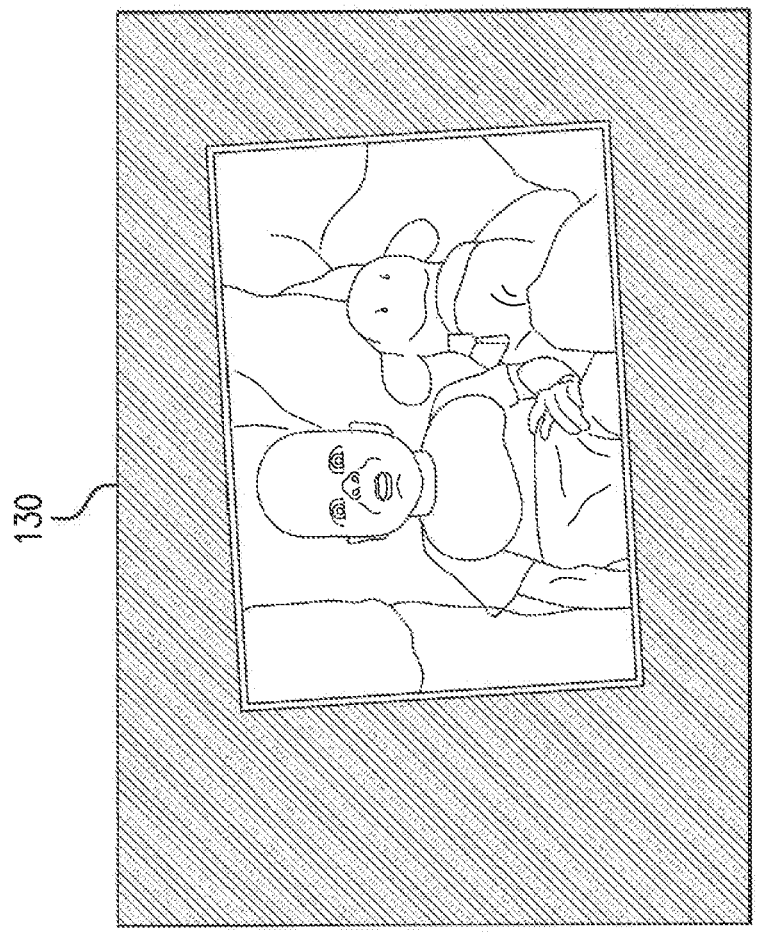
Figure 4B:
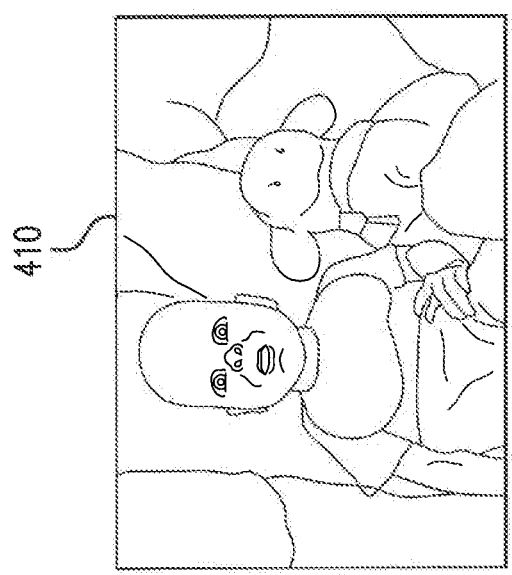

With reference to FIG. 4B, initially, image renderer 120 selects image 410 from image sequence 112 displays image 410 on display 130. In an embodiment, image 410 is identified as a starting input image by a user. In another embodiment, image 410 is identified as a starting input image automatically. Image 410 includes the face of a child characterized by a facial expression and facial pose. As shown in display 130, a white border is added to image 410 and image 410 is aligned together with its border on display 130.

Figure 4C:
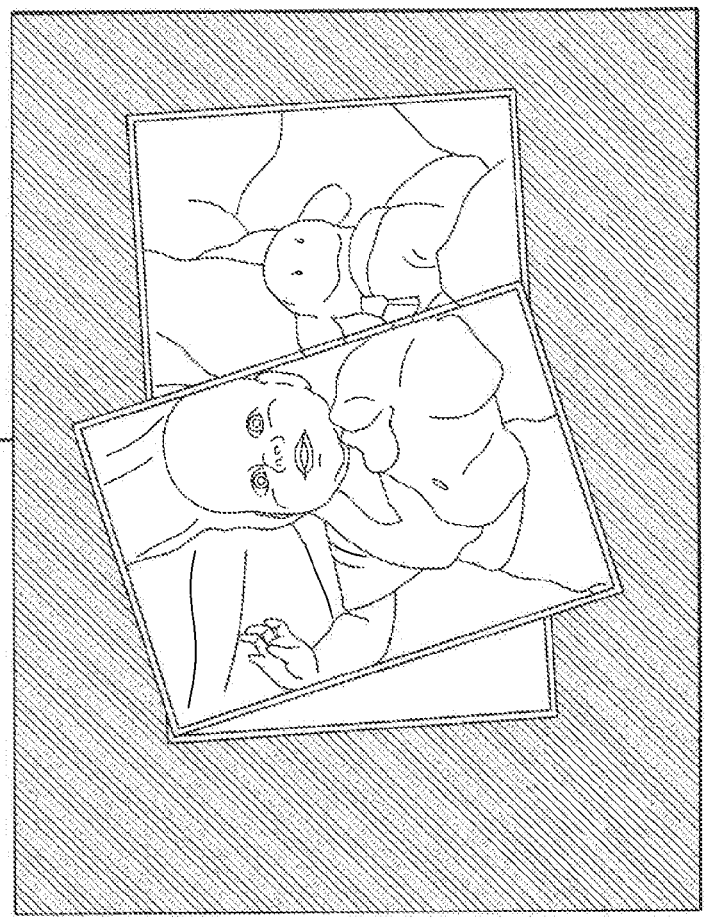
Figure 4C:
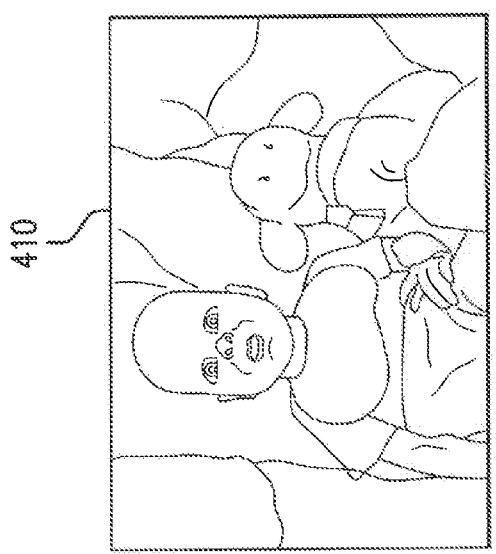
Figure 4C:
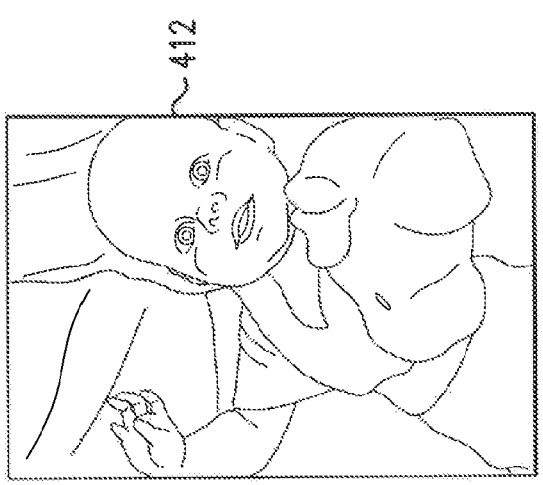

Image renderer 120 then selects the image 412 from image sequence 112. As shown in FIG. 4C, image 412 also includes the face of the child characterized by a different facial expression and facial pose. Image 412 can have a background that is different from image 410. Image 412 can have different dimensions, resolution, brightness, hue, saturation, or any other parameter different from image 410. Image renderer 120 performs one or more of alignment, scaling, rotation or translation (or any other image processing and manipulation) on image 412 so that the child's face appearing in image 412 is aligned with the child's face in image 410. In addition to the alignment, image renderer 120 also adds a border to image 412 and displays image 412 over image 410 as shown in display 130 in FIG. 4C.

Image renderer 120 then selects the image 414 from image sequence 112. As shown in FIG. 4D, image 414 also includes the face of the child characterized by another facial expression and facial pose that is different from the child's facial expression and pose in images 410 and 412. Image 414 has a different background, dimension(s), resolution, brightness, hue, saturation, etc. from images 410 and 412. Image renderer 120 performs one or more of alignment, scaling, rotation or translation on image 414 so that the child's face appearing in image 414 is aligned with the child's face in image 410 and image 412. In addition to the alignment, image renderer 120 also adds a border to image 414 and displays image 414 over images 412 and 410 as shown in display 130 in FIG. 4D. It is to be appreciated that the facial pose and expression that are aligned according to the embodiments may belong to facial images of different individuals and are not limited to a single individual. For example, two different individuals may have one or more of similar pose of expression in different images that can be aligned according to the embodiments. Also, it is to be appreciated that embodiments may be configured to display images added to image sequence 112 in any order. In this way, and as illustrated in FIG. 4E, embodiments can generate and display sequences of meaningful photographs that include facial features with substantial background scene information that provides useful context to a viewer.

Figure 4E:
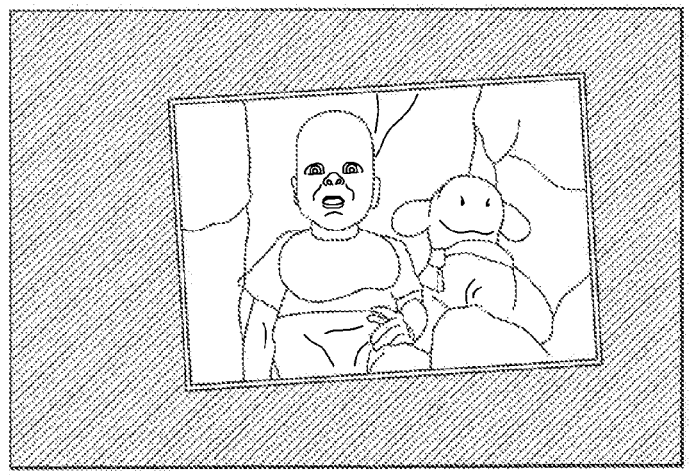
Figure 4E:
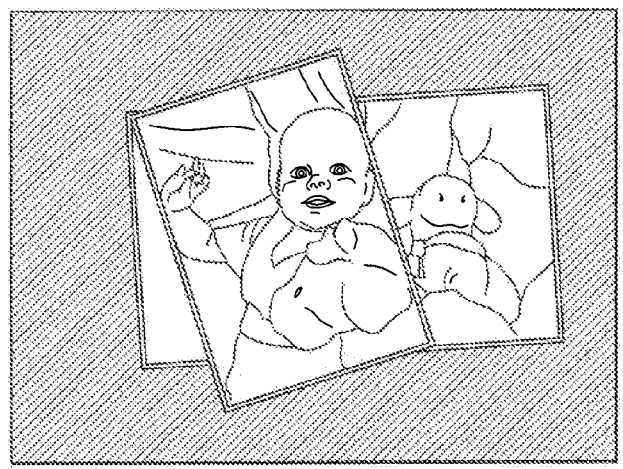
Figure 4E:
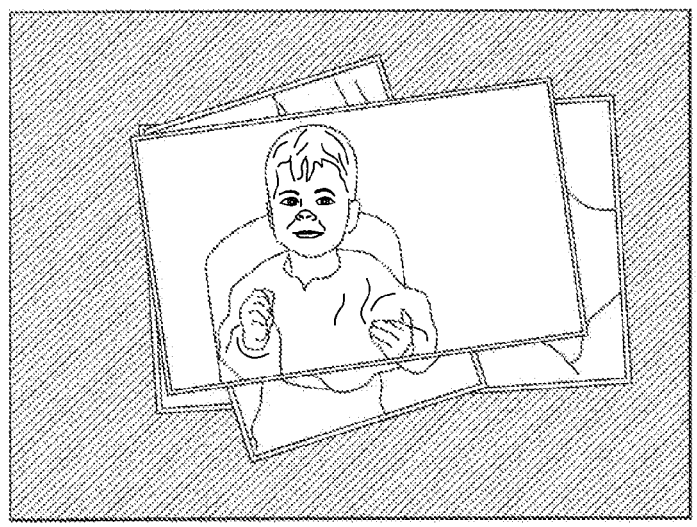

FIG. 4E illustrates a generated sequence of face and expression aligned images 410, 412 and 414. As discussed above, embodiments scale, rotate and translate each image in image sequence 112 before display so that a face (or any facial feature(s) and poses) appearing in a selected image is aligned with a face appearing in a subsequently selected image from image sequence 112. This process of alignment and display is repeated for all other images in image sequence 112. Because the images from image sequence 112 are aligned and sequentially displayed in real time as they are being added to image sequence 112, embodiments are able to generate a face and expression aligned movie. Furthermore, embodiments may store any group of face and expression aligned images as a composite image for subsequent retrieval.

In an embodiment, the image sequence generator 110 and image renderer 120 operate concurrently on separate processing threads. In other words, an image sequence generator thread generates image sequence 112 and an image renderer thread renders and displays images in image sequence 112 in real time as they are being added to image sequence 112. Such a multi-threaded approach achieves improved utilization of processing resources and enables embodiments to render arbitrarily large image collections in real time.

Figure 5:
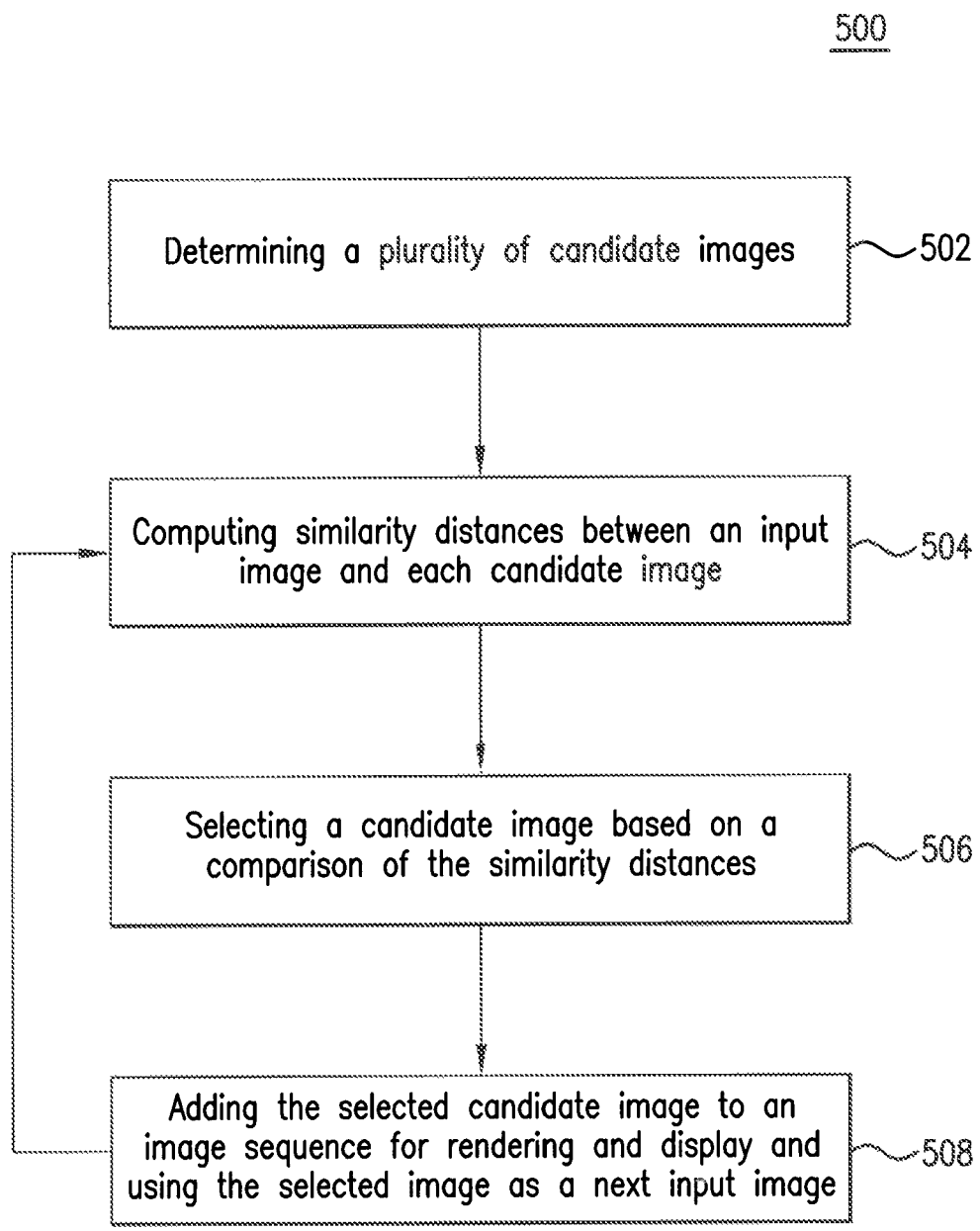
FIG. 5 is a flowchart illustrating an exemplary overall operation of the system, according to an embodiment.

FIG. 5 is a flowchart illustrating an exemplary overall operation of a system for generating sequences of face and expression aligned images, according to an embodiment.

Method 500 begins with determining a plurality of candidate images (stage 502). As an example, image sequence generator 110 determines a number of candidate images. As discussed above, such candidate images may be temporally related.

Similarity distances between the input image and each of the candidate images determined in stage 502 are computed (stage 504). As an example, and as discussed above, a similarity distance can be computed by comparing histograms of oriented gradients (HOG) features of input image 108 with corresponding HOG features of each candidate image. HOG features are a form of feature descriptors used in computer vision and image processing for the purpose of facial feature and pose discrimination and are known to those skilled in the art.

Based on a comparison of the computed similarity distances, a candidate image is selected (stage 506). In an embodiment, the selected candidate image includes facial features that are similar to facial features that appear in the input image. As an example, image sequence determiner 110 selects a candidate image that has the lowest similarity distance (that is, the most similar image with respect to input image 108) compared to the corresponding similarity distance of other candidate images.

The selected candidate image is added to an image sequence for rendering and display (stage 508). As an example, the candidate image selected in stage 506 is added to image sequence 112. As illustrated in method 500, the selected candidate image is used as an input image for computing and comparing the similarity distances in a next iteration of selecting and adding a candidate image to the image sequence. Embodiments can also mark the selected candidate image so that it may not be added again to the image sequence in a subsequent iteration. In an embodiment, images are added to the image sequence until all candidate images have been added to the image sequence. In an embodiment, the images in the image sequence are rendered and displayed in real time as they are being added to the image sequence. Embodiments scale, rotate and translate each image in the image sequence before display so that a face (or any facial feature(s)) appearing in a selected image is aligned with a face appearing in subsequently selected image from the image sequence. This process of alignment and display is repeated for all other images in the image sequence. Because the images from the image sequence are aligned and sequentially displayed in real time as they are being added to the image sequence, embodiments are able to generate a face and expression aligned movie.

Example Computer Embodiment

Figure 6:
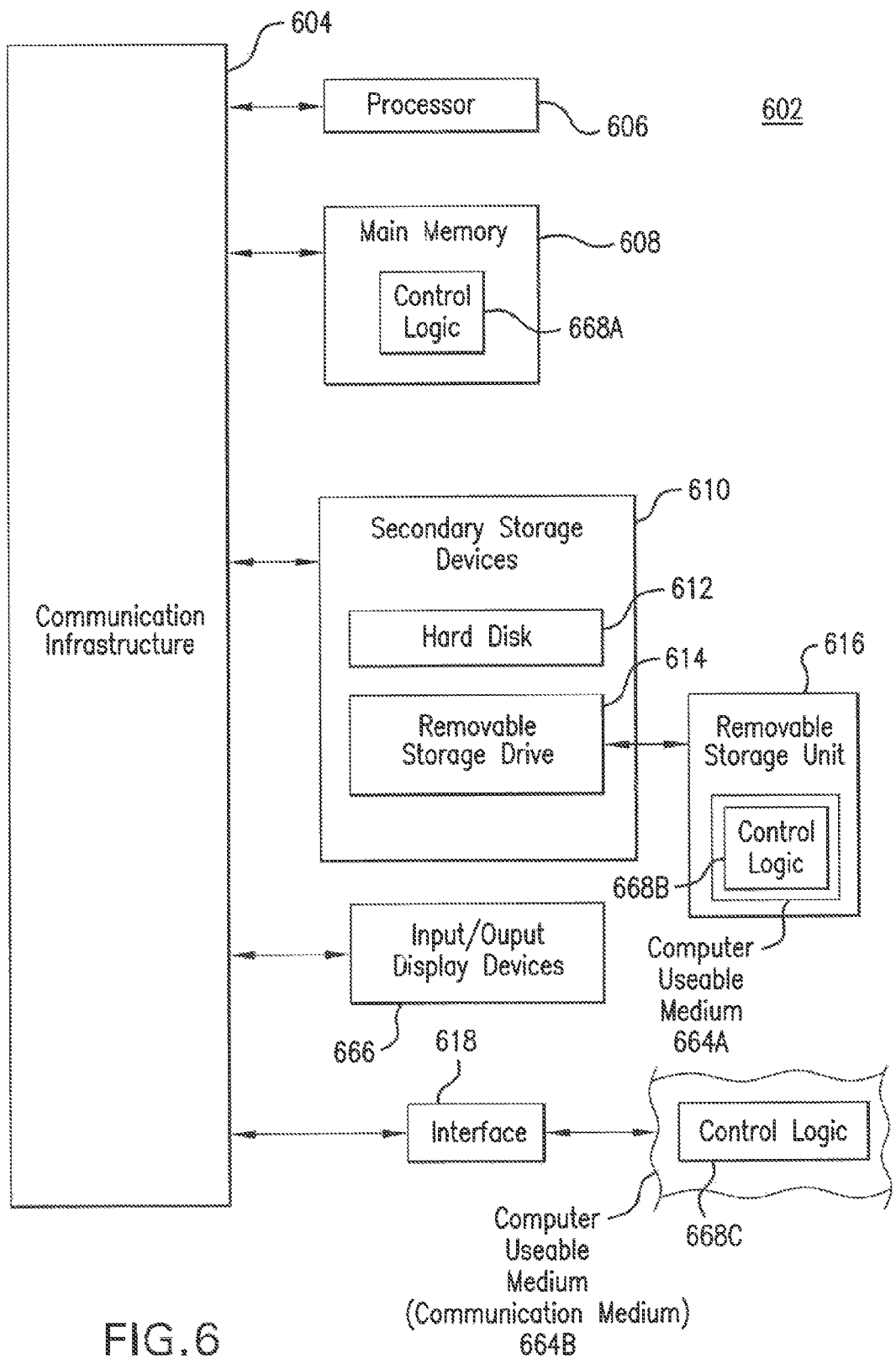
FIG. 6 illustrates an example computer useful for implementing components of the embodiments.

In an embodiment, the system and components of embodiments described herein are implemented using well known computers, such as example computer 602 shown in FIG. 6. For example, image sequence generator 110 and image renderer 120 can be implemented using computer(s) 602.

Computer 602 can be any commercially available and well known computer capable of performing the functions described herein, such as computers available from International Business Machines, Apple, Sun, HP, Dell, Compaq, Cray, etc. Computer 602 can also be any commercially available and well known tablet, mobile device or smart-phone capable of performing the functions described herein, such as devices available from Apple, HTC, RIM, Nokia, Sony, etc.

Computer 602 includes one or more processors (also called central processing units, or CPUs), such as a processor 606. Processor 606 is connected to a communication infrastructure 604.

Computer 602 also includes a main or primary memory 608, such as random access memory (RAM). Primary memory 608 has stored therein control logic 668A (computer software), and data.

Computer 602 also includes one or more secondary storage devices 610. Secondary storage devices 610 include, for example, a hard disk drive 612 and/or a removable storage device or drive 614, as well as other types of storage devices, such as memory cards and memory sticks. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 664A having stored therein computer software 668B (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well known manner.

Computer 602 also includes input/output/display devices 666, such as monitors, keyboards, pointing devices, Bluetooth devices, etc.

Computer 602 further includes a communication or network interface 618. Network interface 618 enables computer 602 to communicate with remote devices. For example, network interface 618 allows computer 602 to communicate over communication networks or mediums 664B (representing a form of a computer useable or readable medium), such as LANs, WANs, the Internet, etc. Network interface 618 may interface with remote sites or networks via wired or wireless connections.

Control logic 668C may be transmitted to and from computer 602 via communication medium 664B.

Any tangible apparatus or article of manufacture comprising a computer useable or readable medium having control logic (software) stored therein is referred to herein as a computer program product or program storage device. This includes, but is not limited to, computer 602, main memory 608, secondary storage devices 610 and removable storage unit 616. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments as contemplated by the inventor(s), and thus, are not intended to limit the present embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal their general nature that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer implemented method for generating a sequence of face and expression aligned images, comprising:
    selecting an entire image from a plurality of candidate images based on a similarity distance of the image compared to an input image;
    adding the entire selected image to an image sequence for real-time display;
    aligning the entire selected image with a previously displayed image so that a face appearing in the entire selected image is aligned with a face appearing in a previously displayed image;
    displaying the entire selected image in the image sequence, wherein the entire selected image is displayed over the previously displayed image based on the aligning;
    selecting an another entire image from the image sequence based on a similarity distance of the another image, upon addition of the prior image to the image sequence;
    aligning the another entire image with the displayed image so that a face appearing in the another image is aligned with a face appearing in the displayed image; and
    displaying the another aligned entire image over the displayed entire image.

2. The method of claim 1, wherein the selecting is based on the similarity distance of the image compared to the selected image of a previous iteration as the input image.

3. The method of claim 1, wherein the selecting of an entire image is from images temporally related by associated timestamps as the plurality of candidate images.

4. The method of claim 1, wherein the selecting is based on the similarity distance computed by histograms of oriented gradient (HOG) features in the input image and the candidate images.

5. The method of claim 1, wherein the selecting is based on the least similarity distance.

6. The method of claim 1, further comprises:
    marking the selected image to not be added again in a subsequent iteration.

7. The method of claim 1, further comprising:
    repeating the selecting, aligning and displaying until all candidate images are added.

8. An article of manufacture including a non-transitory computer-readable medium having instructions stored thereon that, in response to execution by a computing device, causes the computing device to perform operations comprising:
    selecting an entire image from a plurality of candidate images based on a similarity distance of the image compared to an input image;
    adding the entire selected image to an image sequence for real-time display;
    aligning the entire selected image with a previously displayed image so that a face appearing in the entire selected image is aligned with a face appearing in a previously displayed image;
    outputting the entire selected image in the image sequence, wherein the entire selected image is displayed over the previously displayed image based on the aligning;
    selecting an another entire image from the image sequence based on a similarity distance of the another image, upon addition of the prior image to the image sequence;
    aligning the another entire image with the displayed image so that a face appearing in the another image is aligned with a face-appearing in the displayed image; and
    outputting the another aligned entire image for display over the displayed entire image.

9. The article of manufacture of claim 8, wherein the selecting is based on the similarity distance of the image compared to the selected image of a previous iteration as the input image.

10. The article of manufacture of claim 8, wherein the selecting of an entire image is from images temporally related by associated timestamps as the plurality of candidate images.

11. The article of manufacture of claim 8, wherein the selecting is based on the similarity distance computed by histograms of oriented gradient (HOG) features in the input image and the candidate images.

12. The article of manufacture of claim 8, wherein the selecting is based on the least similarity distance.

13. The article of manufacture of claim 8, further comprising instructions that cause the computing device to perform operations comprising:
    marking the selected image to not be added again in a subsequent iteration.

14. The article of manufacture of claim 8, further comprising instructions that cause the computing device to perform operations comprising:
    repeating the selecting, aligning and displaying until all candidate images are added.

15. A system for generating a sequence of face and expression aligned images, comprising:
    a computing device comprising at least one processor and at least one memory;

an image sequence generator implemented on the computing device and configured to:
- select an entire image from a plurality of candidate images based on a similarity distance of the image compared to an input image,
- add the entire selected image to an image sequence for real-time display, and
- select an another entire image from the image sequence based on a similarity distance of the another image, upon addition of the prior image to the image sequence; and an image renderer implemented on the computing device and configured to:
- align the entire selected image with a previously displayed image such that respective facial features and pose are aligned,
- display the entire selected image in the image sequence, wherein the entire selected image is displayed over the previously displayed image based on the alignment,
- align the another entire image with the displayed image so that a face appearing in the another image is aligned with a face appearing in the displayed image, and
- display the another aligned entire image over the displayed entire image.

16. The system of claim 15, wherein the image sequence generator is further configured to mark the entire selected image and configured to use the entire selected image as another input image.

* * * * *